United States Patent [19]

Williams et al.

[11] 4,151,306

[45] Apr. 24, 1979

[54] PROCESS FOR HYDROLYZING PROTEINACEOUS DERIVATIVES OF THE SKIN

[76] Inventors: Maurice A. Williams, 6378 Stonecrest, Brookpark, Ohio 44142; Robert E. Horn, 17499 Whitney Rd., #325, Strongsville, Ohio 44136; John C. Bronikowski, 1434 S. Carpenter #104, Brunswick, Ohio 44212

[21] Appl. No.: 854,779

[22] Filed: Nov. 25, 1977

Related U.S. Application Data

[63] Continuation-in-part of Ser. No. 739,527, Nov. 8, 1976, abandoned.

[51] Int. Cl.$^2$ ............................................. A23J 1/10
[52] U.S. Cl. ................................. 426/456; 426/472; 426/657; 260/123.7
[58] Field of Search ............... 426/657, 465, 473, 805, 426/807, 516, 510, 511, 448, 456, 464, 656, 472, 478; 100/117; 260/123.7

[56] References Cited

U.S. PATENT DOCUMENTS

| | | | |
|---|---|---|---|
| 2,702,245 | 2/1955 | Mayer | 426/656 |
| 2,814,851 | 12/1957 | Hervey | 260/123.7 |
| 3,684,522 | 8/1972 | Anker et al. | 426/656 X |

Primary Examiner—Kenneth M. Schor
Attorney, Agent, or Firm—D. Peter Hochberg

[57] ABSTRACT

A process for hydrolyzing keratinous materials, comprising the steps of mechanically dewatering raw keratinous material to reduce the water content while maintaining the water in its liquid phase, applying heat and pressure to the dewatered material to hydrolyze the material, and drying the material. Also disclosed is the product produced by the foregoing process.

7 Claims, No Drawings

PROCESS FOR HYDROLYZING PROTEINACEOUS DERIVATIVES OF THE SKIN

This is a continuation-in-part application of Ser. No. 739,527 filed Nov. 8, 1976 now abandoned.

This invention relates to a process for hydrolyzing keratinous proteinaceous derivatives of the skin, these derivatives including feathers, hair, wool, fur, nails, claws, hooves, antlers, horns, and the epidermis and dermis of the skin including rawhide and leather. These tissues are derivatives of the skin formed during the embryonic development of an animal, and they are composed substantially of keratin which is a highly polymerized protein having a generally fibrous structure. Because of the high degree of polymerization of keratins, this protein is indigestible to animals which ordinarily digest protein.

An industry has developed over past years for pressure cooking feathers and hair to break down, or hydrolyze, the protein into a simpler state which is highly digestible. This has converted a waste product from slaughterhouses into a profitable by-product. Efforts have been made towards establishing criteria for hydrolyzing feathers to create feather meal suitable as a feed ingredient and for improving hydrolyzing processes, as reflected in documents entitled "Hydrolyzed Poultry Feathers", dated 1959 and prepared by the Poultry Dry-Products Association, Inc., and "Feather Meal" dated 1975, and "AFMA Feed Ingredient Guides" dated 1973, prepared by the National Renderers Association, Inc.

During hydrolyzation of keratinous proteins of skin derivatives, the keratinous material undergoes a chemical-physical reaction which renders it digestible. Raw keratin is indigestible. Keratin, like other proteins, is composed of amino acids joined together by a peptide linkage into very large macro-molecules. The peptide linkage is the primary chemical bond joining together the amino acids. There are also secondary and tertiary bonds which interact to lock the amino acids into a rigid structure within the macro-molecule. The secondary and tertiary bonds are caused by an attraction between electron-rich to electron-poor sections of the protein molecule, by hydrogen bridging, and by attractions between active groups within the various amino acids.

The secondary and tertiary bonds are not true chemical bonds, such as the peptide linkage, but they are strong enough to hold the various parts of the protein molecule in a definite pattern preventing the molecule from twisting or rotating along its central axis like a string of beads.

The structure of the molecule produced by these bonds slows down the action of digesting enzymes in most types of protein, and in certain proteins, such as the keratins, prevents digestion altogether. This is due to the strength of these secondary and tertiary bonds and to the arrangement of amino acids effected by them.

Cooking with heat and water, or chemical treatment with acids, etc., breaks these bonds, allowing the chain of amino acids comprising the protein molecule to unwind and twist and rotate at random. When this happens, the protein is said to be denatured. The protein is still the same chemically (the primary bonds are still intact), but it has lost its distinctive physical arrangement of parts. After denaturation, protein loses (1) any properties of life it once had, and it is no longer living matter, (2) enzymatic activity (most enzymes are proteinaceous in nature), (3) its resistance to enzymatic digestion (digestion is the breaking of the primary bond of the peptide linkage to free the amino acids)—in denatured protein, the peptide linkages are more exposed to the action of enzymes than they are when the protein molecules are held in a rigid position which shields them from enzymes, and (4) its solubility—many proteins coagulate when denatured. It is known that water containing high energy can quickly hydrolyze keratin. For example, water at 275° F. under 30 psi pressure can hydrolyze keratin within 30 minutes to the extent that 70% of it is as digestible as ordinary protein. Under atmospheric conditions at 212° F., this could not be done even if the temperature were held for many hours. To give water the extra heat energy required, it is necessary to operate under pressure so as to elevate the boiling point of the water. As the pressure and temperature increase, so does the energy of the water molecules and, as it increases, the required residence time for the reaction to occur decreases.

According to a known process for hydrolyzing poultry feathers, the feathers are plucked from freshly killed birds and washed into a sluiceway employing water as a vehicle to transport the feathers from the kill floor to the processing room. The feathers are then tumbled through a revolving screen to remove the bulk of the sluiceway water, and the feathers are then processed by either of two methods, a batch cooker method or a continuous method. Both methods employ similar process conditions in that the feathers, with a moisture content of about 60%, are pressure cooked with steam at about 30 to 100 psi for about 30 to 6 minutes. This permits hydrolyzation and causes the feathers to break up into a fine meal. In the batch cooker method, the feather meal is then partially dried in a cooking vessel to reduce the moisture content of the meal to about 40%, and then the meal is final-dried in a continuous dryer to a final moisture content of about 8%.

In the continuous method, the following steps are employed: feathers are fluffed to facilitate their transport through the intake lock of a pressurized vessel; the feathers are hydrolyzed at high moisture content (60 to 80%) within the pressurized vessel, which is operated continuously through intake and outlet locks with an average residence time of 6 to 15 minutes and a pressure of about 70 to 100 psi; the feathers are subjected to a first stage drying of a liquid slurry issuing from the hydrolyzer to a moisture level to about 40%; and the feathers are final-dried to a moisture content of about 8%. It can be seen that the continuous process is merely an extension of the batch process: each process involves hydrolyzing with steam at high moisture levels and employs thermal drying to reduce the moisture content of the finished product.

The prior art includes patents which disclose a variety of processes for converting indigestible proteinaceous materials into digestible products. U.S. Pat. Nos. 3,904,775 and 3,925,565 describe similar processes for producing simulated meat products from various protein materials including keratins. The processes involve mixing proteinaceous materials with water, applying pressure and heat to each mixture to convert it to a flowable substance, extruding the flowable substance in a uniform linear flow to obtain an annular shape, drying the substance, confining the matter and heating it to a temperature above the boiling point of water, and suddenly releasing the pressure on the material to cause the latter to puff into a product resembling a meat product.

U.S. Pat. No. 3,617,313 discloses an apparatus for continuously hydrolyzing poultry feathers and similar fibrous materials. The latter apparatus includes a bin for receiving the raw fibrous product, a conveyor for transporting the raw product to a screw conveyor wherein the fibrous materials are compressed into a pressure impervious plug with much of the liquid squeezed therefrom. The plug is broken into small particles by a fluffer. Since the plug is impervious, it seals the apparatus and enables pressurized steam in the fluffer to fluff the material therein. The fluffed material is then fed into an autoclave type hydrolyzer chamber wherein the material is hydrolyzed under steam pressure, and the material is subsequently dried. Another disclosure of the preparation of digestible protein material is contained in U.S. Pat. No. 2,702,245, where a process is described wherein raw feathers are steam heated in rendering vessels under controlled pressure, after which the steam is released to reduce the moisture content of the product.

Various patents have issued describing processes for converting such protein materials as casein, soybean products, cocoa, cereal products, and the like, into various digestible proteinaceous food products such as simulated meat, animal feed and breakfast foods. The latter processes included mechanical treatment steps such as compressing, mixing, extruding, rolling, heating and folding the raw product with or without liquids, and temperature-pressure treatment steps such as heating, pressurizing, expanding or "puffing" by heating and/or relieving applied pressures. The latter patents include the following U.S. Pat. Nos.: 2,120,138; 3,142,571; 3,440,054; 3,480,442; 3,537,859; 3,667,961; 3,810,764; 3,833,748; and 3,852,492.

It is an object of the present invention to prepare digestible proteinaceous materials from keratinous materials in an efficient and economical manner.

Another object of the invention is to convert keratinous materials into digestible proteinaceous materials by an improved process involving lower costs of drying the output product than under prior processes.

A further object is to convert keratinous materials as set forth above at rates greater than those enjoyed by present processes and apparatus.

Yet a further, more specific object of the invention is to provide an improved process of hydrolyzing feathers.

An additional object of the invention is to provide a continuous process for hydrolyzing feathers.

Another object is to provide an improved digestible proteinaceous product from keratinous materials.

Other objects will be apparent from the description to follow and from the appended claims.

The foregoing objects are achieved according to the invention by a process for treating keratinous materials such as feathers which includes the steps of dewatering the raw material to reduce the moisture content thereof to a level sufficient to support a subsequent hydrolyzing step, confining the dewatered keratinous material in a pressure chamber and applying heat and pressure to the confined material to hydrolyze it without the use of steam and while maintaining any moisture either on or forming a part of the material in its liquid phase, and thereafter drying the hydrolyzed product. As used herein, the term "hydrolyzing" means treating a keratinous material to increase the amount of digestible protein from that found in the raw keratinous material to a substantially greater amount in the treated product. As noted elsewhere herein, raw feathers have been found to contain less than 20% digestible protein whereas feathers hydrolyzed pursuant to an embodiment of the invention had over 65% digestible protein, and raw hog hair had less than 30% digestible protein whereas hog hair hydrolyzed pursuant to the invention had more than 55% digestible protein.

The term "to reduce the moisture content to a level sufficient to support a subsequent hydrolyzing step" means reducing the moisture content of keratinous materials being treated to a level approaching the minimum moisture level required to hydrolyze all of the keratinous material. As noted elsewhere herein, materials treated pursuant to embodiments of this invention have been dewatered to moisture levels of below 45%.

According to the preferred embodiment of the invention described below, keratinous skin derivatives such as feathers are passed through a screw press where the moisture level of the raw material is reduced to approximately 30 to 40%. The water squeezed from the screw press is returned to the sluiceway in which the fresh skin derivatives were transported from the kill floor. The mechanically dewatered material in this embodiment is next passed through an extruder wherein the keratinous material is mechanically subjected to high sheer causing a temperature and pressure build-up in the material, while maintaining the water in its liquid phase, to hydrolyze the keratin. Typical processing conditions in the extruder are 30 seconds residence time, 800 psi pressure, 300° F. temperature and 35% moisture content in the treated material. The hydrolyzed skin derivatives exit the extruder and are conveyed to a steam heated dryer where the moisture is reduced to approximately 8%.

The preferred raw material for this process is any keratinous protein skin derivative ordinarily available as a by-product from a slaughterhouse. Included in this group of materials are poultry feathers and hog hair (with or without hog claws). The raw material should preferably be substantially free from blood, fat, poultry heads and other portions of the animal's body, mainly because these other ingredients reduce the quality of the final product. Good quality feather meal should have about 80 to 85% protein, 8% moisture, and 2.5% fat. The color should be a light golden brown.

The raw product should be dewatered in the event its moisture content is above about 45%. The equipment for the mechanical dewatering of the skin derivatives is any device capable of effectively reducing the moisture level of the fresh wet feed to the preferred moisture level range which, as explained below, is sufficient to support a subsequent hydrolyzing step. Although the moisture can be reduced by heating the raw product to the preferred moisture level for hydrolyzation, it is preferable to do so without the use of heat to evaporate the water, as this will improve the overall economy of the process. (However, in some instances, it could prove advantageous to employ heat to effect all or part of the dewatering operation.)

The preferred mechanical dewatering device is a continuous screw press. Such a device has the advantage of breaking up some of the structure of the keratinous material while dewatering the material, thereby making the material more easily conveyable. U.S. Pat. No. 3,222,797 describes such a device, which is explained as comprising an elongated, cylindrical barrel housing containing an axially disposed rotatable shaft for driving a feed worm to advance wet material through the barrel, and a plurality of knife bars protruding between the worm flights for cooperating with the latter to effect a compression process.

The action of the dewatering process is to compress the skin derivatives and macerate them as they are forceably conveyed through the press. The pressure generated by the press liberates the surface moisture from the derivatives. This moisture flows through slots in the compression barrel of the screw press and is thereby removed from the derivatives. The maceration serves to break up some of the larger pieces of raw material, but it is not necessary that this be done. It is desirable, but not necessary, to heat the raw material during the dewatering process, but not to the extent of vaporizing any of its moisture. Mechanical dewatering, although preferable from an economic point of view, is not the only means suitable for reducing the moisture level to the preferred range for the present invention. Thermal drying, for example, could also be used. Here any suitable form of thermal drying could be used, such as conveying through jacketed, steam-heated vessels.

Hydrolyzing occurs in a device which, according to the present invention, preferably operates at substantially lower moisture levels, higher pressures, and shorter retention times than are used to hydrolyze keratinous skin derivatives according to the prior art. Such a device could be a high shear extruder.

The preferred embodiment of the present invention effects the hydrolyzation of keratinous materials within a residence time of approximately one minute at a moisture level substantially lower than prior processes, by imparting high energy levels to the water molecules by means of high shear extrusion rather than by simply heating the materials or by directing steam thereto. The shear produces heat by friction. Water in the material becomes superheated, but cannot flash off as steam because of the pressures of extrusion. The water, therefore, acquires high energy and quickly penetrates the keratin macro-molecules to break the secondary and tertiary bonds and hydrolyze the keratin. (In the conventional practice, at least some of the water is in the vapor stage during hydrolyzation). The following examples are provided to further illustrate this invention:

EXAMPLE I

Raw poultry feathers containing 65 to 76% moisture were mechanically dewatered in an Anderson IBEC Model #6 moisture Expeller-press to a moisture level between 35 and 40%. This Expeller press includes a set of axially aligned barrel portions, each comprising a plurality of radially extending, circumferentially disposed barrel bars. A screw driven by a shaft extends through the barrel. The Model #6 apparatus is a pilot size unit whose barrel is 6" in diameter and 22" in length; the shaft is driven by a 25 horsepower motor. It was operated at a shaft speed of 38 rpm with barrel bar spacings in the respective barrel portions of 0.05, 0.03 and 0.02 inches, respectively. The shaft was steam heated as a processing aid, but not to the extent that it thermally dried the feathers. The temperature of the dewatered product was approximately 140° F.

Dewatering was employed as a means for mechanically reducing the moisture level when the feathers were in a condition where mechanical removal of the water was possible, so as to bring about a savings over the cost of thermally drying the (subsequently) hydrolyzed meal, and to establish a preferred moisture level for the hydrolyzation step.

The dewatered feathers were then passed, on stream, to an Anderson IBEC pilot-sized model Expander-extruder-cooker. This cooker comprises a standard cylindrical barrel portion and a special tapered portion; a motor-driven extrusion screw having a first portion with a single-flighted, constant diameter worm with interruptions therein, and a second portion with a double-flighted, downwardly tapered uninterrupted worm; and stator pins protruding from the barrel into the channel defined by the interruptions. The screw was driven by a 75-horsepower variable speed motor. The extruder mixed the feathers under high shear conditions by means of the rapidly rotating worm shaft and the series of stator pins. The feathers were forced to flow out through a variable discharge opening defined by a die plate and radially spaced jaws. The discharge opening also imparted shear to the feathers. The die plate had a special rectangular aperture which was ½ inch wide, had approximately ¼ inch land length, and a variable height. Good hydrolyzation was obtained with a height of approximately 1/16 inch.

The feathers were passed through the press, then directly to the extruder, at a capacity of 390 pounds per hour, based on 30-35% moisture content, which was the moisture before drying. The feathers at 30-35% moisture were subjected to a temperature of 300°-350° F., and a pressure of 500-700 psi within the extruder. The total residence time of feathers in the extruder was 20 to 30 seconds. After extrusion, the feather meal was thermally dried to a 10% moisture content (by weight).

The portion of the feather meal protein that was digestible according to the standard pepsin digestibility was as follows for the feather material during the various processing states: 12.6% of the protein in the raw feathers, 14% of the protein in the mechanically dewatered feathers, and 69 to 80% of the protein in the extruded feather meal. In order to find the range of moisture conditions suitable for the nozzle, a test was conducted with feathers dewatered to 35-40% and with extra water added within the extruder. It was found that the feathers could be hydrolyzed until the adjusted moisture exceeded 45%. The feathers were then pressed to 35% moisture, the lowest level possible with the mechanical equipment used, and the feathers were air dried to various levels below 35% with subsequent extrusion operations. It was found that hydrolysis could successfully be achieved for feathers having an initial moisture content of 30%, and it is expected that hydrolysis of feathers dried as low as 20% is achievable as well.

EXAMPLE II

Raw hog hair combined with the claws and containing 60 to 70% moisture content (by weight) was mechanically dewatered in the same screw press used in Example I, except that the worm shaft configuration was different. It had a decreasing channel depth.

The dewatered hog hair contained 37 to 41% water and the hair appeared the same size as raw feed and the claws were cracked somewhat, but not broken into pieces in the press. The temperature of the dewatered hair was 140° F. As in the first Example, the water was mechanically removed to provide for a savings in drying costs and to bring the moisture content within the preferred range.

The partially dewatered hog hair and claws were passed, on stream, through the same extruder used in Example I, at a capacity of 180 pounds per hour input rate. However, the extruder was mechanically different in that the double-flighted tapered worm and a matching barrel section was not used between the end of the shaft and the die plate. In its place the last three worms of the shaft were replaced with worms of a narrower channel and the discharge opening for hog hair was 1" wide rather than ½" wide as in Example I, to avoid clogging of the opening. The land length was the same as in Example I. The vertical heights of the jaws were approximately 1/16 inch. Hydrolyzation in the extruder occurred under the following conditions: 29 to 41% moisture, 250° to 325° F., 1000 to 1300 psi, and a residence time of 20 to 30 seconds.

The portion of the hog hair protein that was digestible, according to the same test procedures used in Example I, was as follows: 27.5% of the protein in the raw hog hair, 24.5% of the protein in the mechanically dewatered hair, 60% to 68% of the protein in the hydrolyzed hog hair meal.

EXAMPLE III

Raw poultry feathers containing 55 to 65% moisture were mechanically dewatered in the same screw press used in the above Examples, under a variety of press conditions. It was found that the poultry feathers can be easily dewatered to moisture levels of 35–37%. The following summarizes the press conditions tested:

| Test No. | 1 | 2 | 3 | 4 | 5 | 6 |
|---|---|---|---|---|---|---|
| Shaft RPM | 40 | 70 | 40 | 40 | 40 | 30 |
| % Motor load (of 25 HP) | 55 | 60 | 50 | 55 | 65 | 50 |
| Type choke | A | A | B | B | B | B |
| % closed choke area | 90 | 90 | 50 | 90 | 99 | 99 |
| Production rate (lb/hr.) | 450 | 690 | 651 | 648 | 648 | 540 |
| Residual moisture | 35 | 35 | 36 | 34 | 35 | 37 |

Type A choke is a four-jaw arrangement working similar to an Iris diaphram, and type B is a rotating plate choke with a matching stationary plate permitting full closure when the openings are staggered between the two plates. % closed means how much of the total opening was closed during operation.

Fresh feathers were then processed through the screw press thence to the extruder equipped in the manner of the extruder in Example II. The extruder was able to hydrolyze feathers at a capacity of 500 pounds per hour of dewatered feathers containing 27–30% moisture. The operating conditions were 200 rpm extruder shaft rotation, 280° F. internal temperature, 900 psi internal pressure, and a die area of ½" wide by approximately 1/16" high, with an approximately ¼ inch land length. The protein in the resulting product had a pepsin digestibility of 75%.

Although in most situations, the raw keratinous material being treated according to this invention will have an initial moisture content which exceeds the amount required to support a subsequent hydrolyzing step, there may be some instances where the moisture content of the raw materials is less than the moisture content needed to support the subsequent hydrolyzing step. In the latter event, it is within the scope of the invention to elevate the moisture content of the raw material to the level needed to support the subsequent hydrolyzing step. Such a step of elevating the moisture content may comprise injecting moisture into the keratinous materials during the mechanical working of the keratinous materials to hydrolyze the protein therein.

The preferred embodiments of the invention provide processes for treating keratinous materials by hydrolyzing a mixture of the keratinous materials and water under mechanical pressure which exceeds the vapor pressure of the water. A pressure is established which raises the temperature above the boiling point of water at atmospheric pressure, while maintaining the water in its liquid phase. The process provides a hydrolyzing action which is more effective and efficient than prior hydrolyzing processes, and can be a continuous process as well.

The invention has been described in detail with particular emphasis on preferred embodiments thereof, but it will be understood that variations and modifications within the spirit and scope of the invention may occur to those skilled in the art to which the invention pertains.

We claim:
1. A process for treating raw keratinous materials, said process comprising the steps of
   mechanically dewatering raw keratinous materials to reduce the moisture contents of the materials to a level sufficient to support the subsequent hydrolyzing step without excess moisture;
   high shear extruding the keratinous materials to hydrolyze the protein while retaining the moisture in the materials during extruding by exerting a mechanical pressure on the materials is excess of the vapor pressure of the moisture in the materials; and drying the material.
2. The invention according to claim 1 wherein the step of high shear extruding raw keratinous materials comprises treating the keratinous material in a screw press to establish a moisture content of 30 to 40% by weight of the entire dewatered keratinous material.
3. The invention according to claim 1 and further comprising the step of elevating the moisture content of the raw keratinous materials in the event the moisture content of the raw materials is less than the moisture content needed to support the subsequent hydrolyzing step.
4. The invention according to claim 3 wherein the step of elevating the moisture of the keratinous material comprises the injecting moisture into the keratinous materials during the mechanical working step.
5. The invention according to claim 1 wherein the step of high shear extruding the keratinous materials comprises
   continuously feeding the keratinous material into an extruding apparatus and applying extrusion pressure into such material for a sufficient period of time to hydrolyze the material.
6. The invention according to claim 5 wherein said extrusion pressure is in the range of 200 to 1500 psi to establish a moisture content in the keratinous materials of from 20 to 45% by weight.
7. The invention according to claim 1 wherein:
   the step of mechanically dewatering the raw keratinous materials comprises dewatering the materials to establish a moisture content in the range of 35 to 40%; and
   the step of high shear extruding the keratinous materials comprises extruding at a pressure in the range of 500 psi to 700 psi, at a temperature in the range of 250° F. to 400° F., for an extrusion period in the range of 20 to 30 seconds.

* * * * *